US010353742B2

(12) United States Patent
Park et al.

(10) Patent No.: US 10,353,742 B2
(45) Date of Patent: *Jul. 16, 2019

(54) TRACKING LARGE NUMBERS OF MOVING OBJECTS IN AN EVENT PROCESSING SYSTEM

(71) Applicant: Oracle International Corporation, Redwood Shores, CA (US)

(72) Inventors: Hoyong Park, San Jose, CA (US); Eric Hsiao, San Mateo, CA (US); Andy Piper, Amersham (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,121

(22) Filed: Oct. 26, 2017

(65) Prior Publication Data
US 2018/0046511 A1  Feb. 15, 2018

Related U.S. Application Data

(63) Continuation of application No. 15/360,650, filed on Nov. 23, 2016, now Pat. No. 9,804,892, which is a
(Continued)

(51) Int. Cl.
*G06F 9/50* (2006.01)
*G06F 9/54* (2006.01)
(Continued)

(52) U.S. Cl.
CPC ............ *G06F 9/505* (2013.01); *G06F 9/5027* (2013.01); *G06F 9/542* (2013.01);
(Continued)

(58) Field of Classification Search
CPC ... G06F 9/54; G06F 9/542; G06F 9/50; G06F 9/5027; G06F 9/505; G06F 17/30327; G06F 17/30377
See application file for complete search history.

(56) References Cited

U.S. PATENT DOCUMENTS 6,397,262 B1   5/2002  Hayden et al.
6,718,278 B1   4/2004  Steggles
(Continued)

FOREIGN PATENT DOCUMENTS

WO   WO2012158360   11/2012

OTHER PUBLICATIONS

U.S. Appl. No. 13/107,742, Final Office Action dated Jul. 3, 2013, 19 pages.
(Continued)

*Primary Examiner* — Umut Onat
(74) *Attorney, Agent, or Firm* — Kilpatrick Townsend & Stockton LLP

(57) ABSTRACT

Techniques for tracking large numbers of moving objects in an event processing system are provided. An input event stream can be received, where the events in the input event stream represent the movement of a plurality of geometries or objects. The input event stream can then be partitioned among a number of processing nodes of the event processing system, thereby enabling parallel processing of one or more continuous queries for tracking the objects. The partitioning can be performed such that each processing node is configured to track objects in a predefined spatial region, and the spatial regions for at least two nodes overlap. This overlapping window enables a single node to find, e.g., all of the objects within a particular distance of a target object, even if the target object is in the process of moving from the region of that node to the overlapping region of another node.

20 Claims, 8 Drawing Sheets

Related U.S. Application Data continuation of application No. 14/883,815, filed on Oct. 15, 2015, now Pat. No. 9,535,761, which is a continuation of application No. 13/107,742, filed on May 13, 2011, now Pat. No. 9,189,280.

(51) Int. Cl.
*G06F 17/30* (2006.01)
*G06F 16/22* (2019.01)
*G06F 16/23* (2019.01)

(52) U.S. Cl.
CPC ...... *G06F 16/2237* (2019.01); *G06F 16/2246* (2019.01); *G06F 16/2379* (2019.01)

(56) References Cited

U.S. PATENT DOCUMENTS

| | | | |
|---|---|---|---|
| 8,155,880 | B2 | 4/2012 | Patel et al. |
| 8,447,744 | B2 | 5/2013 | De Castro Alves et al. |
| 8,959,106 | B2 | 2/2015 | De Castro Alves et al. |
| 9,058,360 | B2 | 6/2015 | De Castro Alves et al. |
| 9,189,280 | B2 | 11/2015 | Park et al. |
| 9,305,057 | B2 | 4/2016 | De Castro Alves et al. |
| 9,430,494 | B2 | 8/2016 | Park et al. |
| 9,535,761 | B2 | 1/2017 | Park et al. |
| 9,804,892 | B2 | 10/2017 | Park et al. |
| 9,852,186 | B2 | 12/2017 | Herwadkar et al. |
| 2005/0108368 | A1 | 5/2005 | Mohan et al. |
| 2006/0007308 | A1 | 1/2006 | Ide et al. |
| 2007/0156964 | A1 | 7/2007 | Sistla |
| 2007/0192301 | A1 | 8/2007 | Posner |
| 2008/0243675 | A1 | 10/2008 | Parsons et al. |
| 2009/0088962 | A1 | 4/2009 | Jones |
| 2009/0172014 | A1 | 7/2009 | Huetter |
| 2009/0257314 | A1 | 10/2009 | Davis et al. |
| 2011/0321057 | A1 | 12/2011 | Mejdrich et al. |
| 2012/0291049 | A1 | 11/2012 | Park et al. |
| 2016/0034311 | A1 | 2/2016 | Park et al. |
| 2017/0075726 | A1 | 3/2017 | Park et al. |

OTHER PUBLICATIONS

U.S. Appl. No. 13/107,742, Final Office Action dated Jan. 21, 2015, 23 pages.

U.S. Appl. No. 13/107,742, Non-Final Office Action dated Feb. 14, 2013, 16 pages.

U.S. Appl. No. 13/107,742, Non-Final Office Action dated Jun. 19, 2014, 20 pages.

U.S. Appl. No. 13/107,742, Notice of Allowance dated Jul. 8, 2015, 9 pages.

U.S. Appl. No. 14/883,815, Non-Final Office Action dated May 10, 2016, 32 pages.

U.S. Appl. No. 14/883,815, Notice of Allowance dated Aug. 30, 2016, 13 pages.

U.S. Appl. No. 15/360,650, Non-Final Office Action dated Mar. 9, 2017, 34 pages.

U.S. Appl. No. 15/360,650, Notice of Allowance dated Jul. 24, 2017, 13 pages.

International Application No. PCT/US2012/036353, International Preliminary Report on Patentability dated Nov. 28, 2013, 6 pages.

International Application No. PCT/US2012/036353, International Search Report and Written Opinion dated Sep. 12, 2012, 11 pages.

Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, Jan. 1, 2003, pp. 225-233.

Vijayalakshmi et al., Processing Location Dependent Continuous Queries in Distributed Mobile Databases Using Mobile Agents, IET-UK International Conference on Information and Communication Technology in Electrical Sciences (ICTES 2007), Dec. 2007, pp. 1023-1030.

Wang et al., Distributed continuous range query processing on moving objects, DEXA'06 Proceedings of the 17th international conference on Database and Expert Systems Applications, 2006, pp. 655-665.

Wu et al., Dynamic Data Management for Location Based Services in Mobile Environments, Database Engineering and Applications Symposium, 2003, Jul. 2003, pp. 180-189.

TRACKING LARGE NUMBERS OF MOVING OBJECTS IN AN EVENT PROCESSING SYSTEM

CROSS-REFERENCES TO RELATED APPLICATIONS

The present application is a continuation of, and claims the benefit of and priority to U.S. patent application Ser. No. 15/360,650, filed Nov. 23, 2016, and patented as U.S. Pat. No. 9,804,892, on Oct. 31, 2017, which is a continuation of U.S. patent application Ser. No. 14/883,815, filed Oct. 15, 2015, and patented as U.S. Pat. No. 9,535,761, on Jan. 3, 2017, which is a continuation of U.S. patent application Ser. No. 13/107,742, filed May 13, 2011, and patented as U.S. Pat. No. 9,189,280, on Nov. 17, 2015, the entire contents of which are herein incorporated by reference for all purposes.

BACKGROUND

Embodiments of the present invention relate in general to event processing, and in particular to techniques for tracking large numbers of moving objects in an event processing system.

Traditional database management systems (DBMSs) execute queries in a "one-off" fashion over finite, stored data sets. For example, a traditional DBMS will receive a request to execute a query from a client, execute the query exactly once against one or more stored database tables, and return a result set to the client.

In recent years, event processing systems have been developed that can execute queries over streams of data rather than finite data sets. Since these streams (referred to herein as "event streams") can comprise a potentially unbounded sequence of input events, an event processing system can execute a query over the streams in a continuous (rather than one-off) manner. This allows the system to continually process new events as they are received. Based on this processing, the event processing system can provide an ongoing stream of results to a client. One example of such an event processing system is the Oracle Complex Event Processing (CEP) Server developed by Oracle Corporation.

Given their unique capabilities, event processing systems are well-suited for enabling applications that require real-time or near real-time processing of streaming data. For instance, event processing systems are particularly well-suited for building "spatial" applications (i.e., applications that require analysis of streams of spatial or geographic location data). Examples of such spatial applications include geographic information systems (GIS), location-enabled business intelligence solutions, geomatics/telematics applications, and the like. Some event processing systems, such as the Oracle CEP Server, provide an extension mechanism for supporting specific spatial features/operations (e.g., spatial data indexing, proximity and overlap determinations, etc.). Information regarding such an extension mechanism can be found in U.S. patent application Ser. No. 12/949,081, filed Nov. 18, 2010, titled "SPATIAL DATA CARTRIDGE FOR EVENT PROCESSING SYSTEMS," the entire contents of which are incorporated herein by reference for all purposes.

One limitation with existing event processing systems that allow spatial operations is that they generally cannot support the tracking of a very large number (e.g., greater than one million) of moving geometries or objects. For example, consider use cases from the telematics market where an application needs to (1) determine all of the vehicles impacted by certain traffic events, or (2) detect "buddies" close to a moving vehicle position, where there is an m to n relation between the number of vehicles and buddies using other vehicles. If the total number of vehicles in these use cases is in the range of millions, a conventional event processing system generally cannot index and keep track of all of the vehicles in an efficient manner.

BRIEF SUMMARY

Embodiments of the present invention provide techniques for tracking large numbers of moving objects in an event processing system. In one set of embodiments, an input event stream can be received, where the events in the input event stream represent the movement of a plurality of geometries or objects. The input event stream can then be partitioned among a number of processing nodes of the event processing system, thereby enabling parallel processing of one or more continuous queries for tracking the objects. In a particular embodiment, the partitioning can be performed such that (1) each processing node is configured to track objects in a predefined spatial region, and (2) the spatial regions for at least two nodes overlap. This overlapping window enables a single node to find, e.g., all of the objects within a particular distance of a target object, even if the target object is in the process of moving from the region of that node to the overlapping region of another node.

According to one embodiment of the present invention, a method is provided that includes receiving, by a computer system, an input event stream comprising a sequence of events, the sequence of events representing the movement of a plurality of objects. The method further includes partitioning, by the computer system, the input event stream among a plurality of processing nodes to facilitate parallel tracking of the objects, where each processing node is configured to track objects in a predefined spatial region, and where the predefined spatial regions for at least two processing nodes in the plurality of processing nodes overlap.

In one embodiment, each event includes an identifier of an object and a current position of the object.

In one embodiment, partitioning the input event stream includes, for each event, determining a subset of processing nodes in the plurality of processing nodes configured to track objects in a predefined spatial region that encompasses the current position of the object; and for each processing node in the plurality of processing nodes: determining whether the processing node is in the subset; if the processing node is in the subset, determining whether to insert or update the event in a relation operated on by the processing node; and if the processing node is not in the subset, determining whether to delete the event from the relation operated on by the processing node.

In one embodiment, determining whether to insert or update the event in the relation operated on by the processing node includes retrieving, from a bit vector stored for the processing node, a bit value associated with the object; if the bit value is zero, transmitting to the processing node a command for inserting the event into the relation and setting the bit value to one; and if the bit value is one, transmitting to the processing node a command for updating the event in the stream.

In one embodiment, determining whether to delete the event from the relation operated on by the processing node includes retrieving, from a bit vector stored for the processing node, a bit value associated with the object; and if the bit value is one, transmitting to the processing node a command for deleting the event from the relation and clearing the bit value to zero.

In one embodiment, the predefined spatial regions for the plurality of processing nodes are indexed using an R-tree index.

In one embodiment, determining the subset of processing nodes includes performing, based on the current position of the object, a search into the R-tree index.

In one embodiment, the computer system is a load balancing node of an event processing system.

In one embodiment, the sequence of events represent the movement of more than one million distinct objects.

In one embodiment, the plurality of objects are motor vehicles.

In one embodiment, the predefined spatial regions for the plurality of processing nodes are one-dimensional, two-dimensional, or three-dimensional regions.

According to another embodiment of the present invention, a non-transitory computer readable medium having stored thereon program code executable by a processor is provided. The program code includes code that causes the processor to receive an input event stream comprising a sequence of events, the sequence of events representing the movement of a plurality of objects; and code that causes the processor to partition the input event stream among a plurality of processing nodes to facilitate parallel tracking of the objects, where each processing node is configured to track objects in a predefined spatial region, and where the predefined spatial regions for at least two processing nodes in the plurality of processing nodes overlap.

According to another embodiment of the present invention, an event processing system that comprises a load balancer node and a plurality of processing nodes. The load balance node is configured to receive an input event stream comprising a sequence of events, the sequence of events representing the movement of a plurality of objects; and partition the input event stream among the plurality of processing nodes to facilitate parallel tracking of the objects, wherein each processing node is configured to track objects in a predefined spatial region, and wherein the predefined spatial regions for at least two processing nodes in the plurality of processing nodes overlap.

The foregoing, together with other features and embodiments, will become more apparent when referring to the following specification, claims, and accompanying drawings.

BRIEF DESCRIPTION

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for tracking large numbers of moving objects in an event processing system. In one set of embodiments, an input event stream can be received, where the events in the input event stream represent the movement of a plurality of geometries or objects. The input event stream can then be partitioned among a number of processing nodes of the event processing system, thereby enabling parallel processing of one or more continuous queries for tracking the objects. In a particular embodiment, the partitioning can be performed such that (1) each processing node is configured to track objects in a predefined spatial region, and (2) the spatial regions for at least two nodes overlap. This overlapping window enables a single node to find, e.g., all of the objects within a particular distance of a target object, even if the target object is in the process of moving from the region of that node to the overlapping region of another node.

Figure 1:
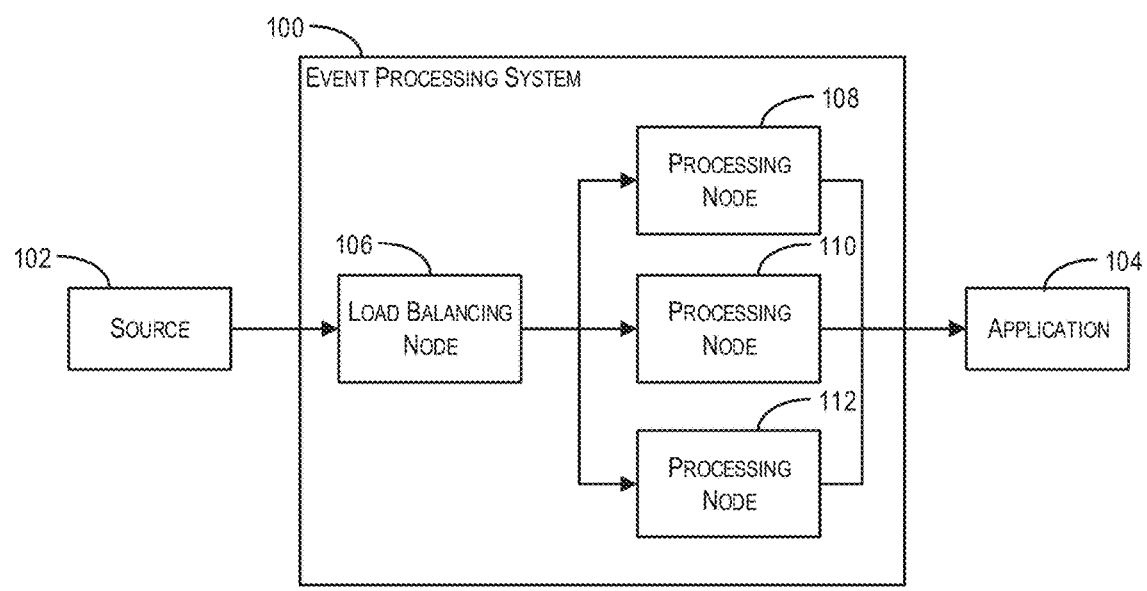
FIG. 1 is a simplified block diagram of an event processing system in accordance with an embodiment of the present invention.

FIG. 1 is a simplified block diagram of an event processing system 100 according to an embodiment of the present invention. Event processing system 100 can be implemented in hardware, software, or a combination thereof. Unlike traditional DBMSs, event processing system 100 can process queries (i.e., "continuous queries") in a continuous manner over potentially unbounded, real-time event streams. For example, event processing system 100 can receive one or more input event streams from a source (e.g., source 102), execute continuous queries against the input event streams, and generate one or more output event streams destined for a client (e.g., application 104). In a particular embodiment, event processing system 100 can include a mechanism (such as the spatial data cartridge described in U.S. patent application Ser. No. 12/949,081 titled "SPATIAL DATA CARTRIDGE FOR EVENT PROCESSING SYSTEMS") that enables the system to process continuous queries that reference spatial data types, method, fields, and the like.

As shown, event processing system 100 can include a load balancing node 106 and one or more processing nodes 108-112. Although only a single load balancing node and three processing nodes are depicted in FIG. 1, any number of such nodes can be supported.

In one set of embodiments, load balancing node 106 can be configured to partition an input event stream received from source 102 among processing nodes 108-112, thereby enabling the processing nodes to execute one or more continuous queries over the event stream in parallel. By way of example, if the input event stream comprises events E1 through E9, load balancing node 106 might decide to partition the stream such that events E1-E3 are handled by processing node 108, events E4-E6 are handled by processing node 110, and events E7-E9 are handled by processing node 112. In one embodiment, this partitioning can be accomplished by inserting, updating, or deleting events into/from relations maintained by each processing node.

In the context of a spatial application, the input event stream received by load balancing node 106 from source 102 can include events that correspond to the movement of a plurality of geometries or objects (e.g., people, motor vehicles, airplanes, etc.). In these embodiments, load balancing node 106 can partition the events among processing nodes 108-112 based on location information, such that each processing node is responsible for executing queries against a relation representing a predefined spatial region. In various embodiments, the predefined spatial region can be a one-dimensional, two-dimensional, or three-dimensional region. If the spatial application simply requires the identification of non-moving objects in an area of interest (e.g., a geo-fencing use case), the spatial regions handled by each processing node can be disjoint, and no special processing needs to be performed by load balancing node 106 to insert/update/delete events into the relations associated with the processing nodes—the relations will generally be static.

However, if the spatial application requires the tracking of moving objects across an area of interest, the spatial regions handled by adjacent processing nodes can overlap to some extent. This overlapping window enables a single processing node to find, e.g., all of the objects within a particular distance of a target object, even if the target object is in the process of moving from the region of that node to the overlapping region of another node. The processing performed by load balancing node 106 to enable partitioning across overlapping regions is described in greater detail below.

As described above, processing nodes 108-112 can each be configured to execute one more continuous queries over some partition or subset of the input event stream received from source 102. In the spatial context, processing nodes 108-112 can each be configured to execute one more continuous queries with respect to objects located in a predefined spatial region. Further, to accommodate the tracking of moving objects, the spatial regions for two more processing nodes can overlap. In one embodiment, processing nodes 108-112 can each correspond to a separate processor in a single machine. In other embodiments, processing nodes 108-112 can each correspond to an event processing server instance running on a separate machine.

It should be appreciated that event processing system 100 of FIG. 1 is illustrative and not intended to limit embodiments of the present invention. For example, event processing system 100 can have other capabilities or include other components that are not specifically described. One of ordinary skill in the art will recognize many variations, modifications, and alternatives.

Figure 2:
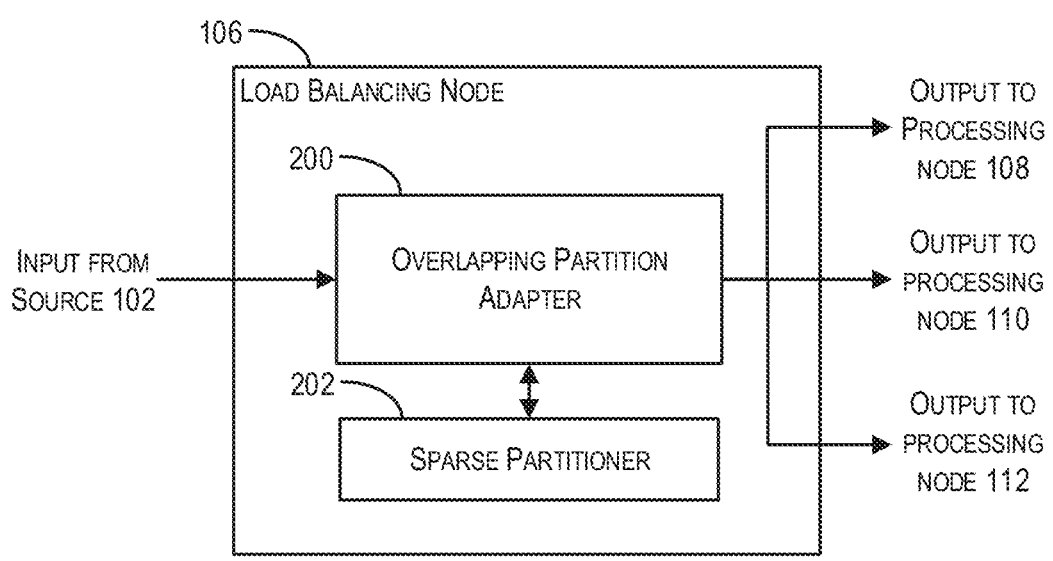
FIG. 2 is a simplified block diagram of a load balancing node in accordance with an embodiment of the present invention.

FIG. 2 is a simplified block diagram that illustrates a functional representation of load balancing node 106 according to an embodiment of the present invention. As shown, load balancing node 106 can include an overlapping partition adapter 200 and a sparse partitioner 202.

In various embodiments, overlapping partition adapter 200 is configured to receive input events from source 102 and efficiently partition the events among processing nodes 108-112 in a manner that takes into account overlapping regions between the processing nodes. By way of example, consider an object moving across a 2D area, where a first portion of the area is handled by processing node 108 and a second, overlapping portion of the area is handled by processing node 110. Assume that the object starts out at time T1 within the region handled by processing node 108, and at time T2 moves into the overlap area between node 108 and node 110. When this occurs, the event corresponding to the object should be inserted into the relation maintained by processing node 110 (so that it is "visible" to processing node 110), while also being updating in the relation maintained by processing node 108. Further, assume that the object moves at time T3 entirely into the region handled by node 110. At this point, the event corresponding to the object should be deleted from the relation maintained by node 108 while be updated in the relation maintained by node 110.

To accomplish the above, overlapping partition adapter 200 can carry out an algorithm in load balancing node 106 that appropriately inserts, updates, or deletes events to/from the relations maintained by processing nodes 108-112 to ensure that the processing nodes are correctly updated to track the movement of objects across the nodes. In certain cases, this algorithm can cause an event corresponding to an object to be inserted/updated in the relations of two or more processing nodes (if it is determined that the object is in an overlapping area between the nodes).

In a particular embodiment, overlapping partition adapter 200 can maintain a bit vector for each processing node, where each bit vector includes a bit entry for each unique object being processing by system 100. If the bit entry for a given object is set, that indicates that an event corresponding to the object was previously inserted into the relation being handled by the processing node (and it is still there). If the bit entry is not set, that indicates that an event corresponding to the object has not yet been inserted into (or was deleted from) the relation being handled by the processing node. These bit vectors allow overlapping partition adapter 200 to keep track of which processing nodes it has inserted events into, and which processing nodes it needs to update or delete a given event/object from. The details of the algorithm performed by overlapping partition adapter 200 (and how it updates these bit vectors) is described with respect to FIGS. 3-6 below.

Sparse partitioner 202 is an auxiliary component of load balancing node 106 that is configured to identify "participating" processing nodes for a given input event/object. In other words, sparse partitioner 202 can determine which processing nodes handle a spatial region that covers the current location of a given object. In various embodiments, overlapping partition adapter 200 can invoke sparse partitioner 202 to obtain a list of participating processing nodes for each input event or object and use the list within its partitioning algorithm.

In one set of embodiments, sparse partitioner 202 can maintain an Rtree index that indexes bounding rectangles associated with the processing nodes. Each bounding rectangle can represent the spatial region handled by a particular node. Accordingly, when an input event is received, sparse partitioner 202 can use the coordinates for the object associated with the event to perform a search into the Rtree index and return a list or array of processing nodes whose bounding rectangle covers the coordinates.

It should be appreciated that load balancing node 106 of FIG. 2 is illustrative and not intended to limit embodiments of the present invention. For example, load balancing node 106 can have other capabilities or include other components that are not specifically described. One of ordinary skill in the art will recognize many variations, modifications, and alternatives.

Figure 3:
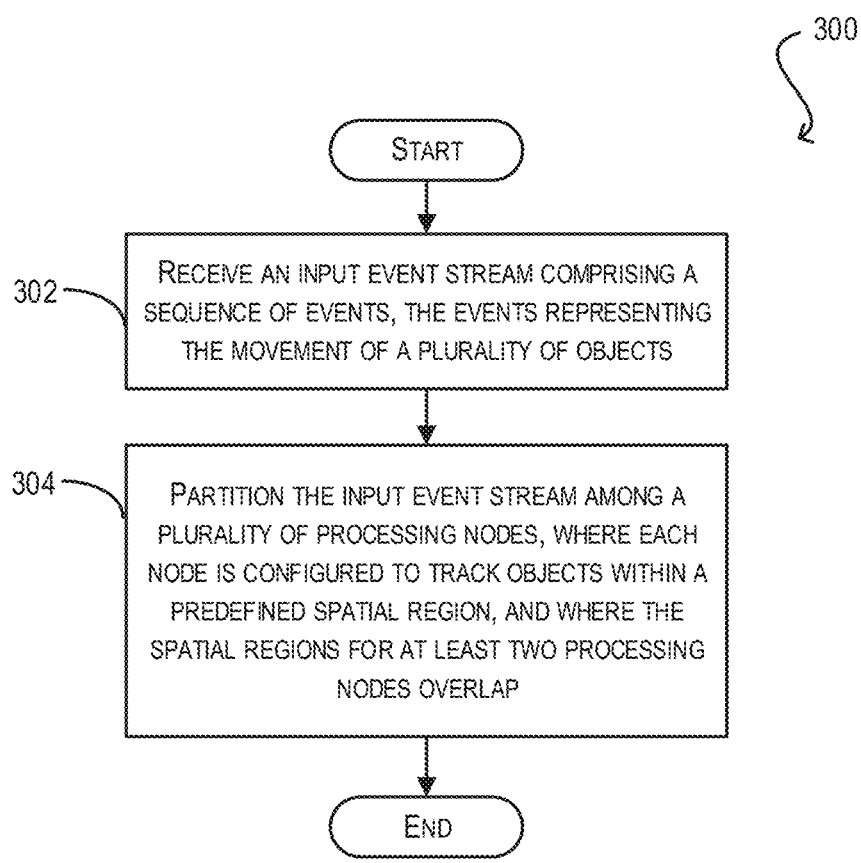
FIGS. 3-6 are flow diagrams of a process for partitioning an input event stream among a plurality of processing nodes in accordance with an embodiment of the present invention.

FIG. 3 is a flow diagram illustrating a process 300 for partitioning an input event stream among a plurality of processing nodes according to an embodiment of the present invention. In one set of embodiments, process 300 can be carried out by overlapping partition adapter 200 of FIG. 2. Process 300 can be implemented in hardware, software, or a combination thereof. As software, process 300 can be encoded as program code stored on a machine-readable storage medium.

At block 302, overlapping partition adapter 200 can receive an input event stream comprising a sequence of events, where the events represent the movement of a plurality of objects. For example, each event can include an identifier of an object, a current position (e.g., coordinates)

of the object, and a timestamp. In a particular embodiment, the events in the event stream can represent the movement of a very large number of objects (e.g., greater than one million).

At block 304, overlapping partition adapter 200 can partition the input event stream among a plurality of processing nodes (e.g., nodes 108-112 of FIG. 1), where each node is configured to track objects within a predefined spatial region, and where the spatial regions for at least two processing nodes overlap. As discussed above, this overlap enables a single node to find, e.g., all of the objects within a particular distance of a target object, even if the target object is in the process of moving from the region of that node to the overlapping region of another node.

Figure 4:
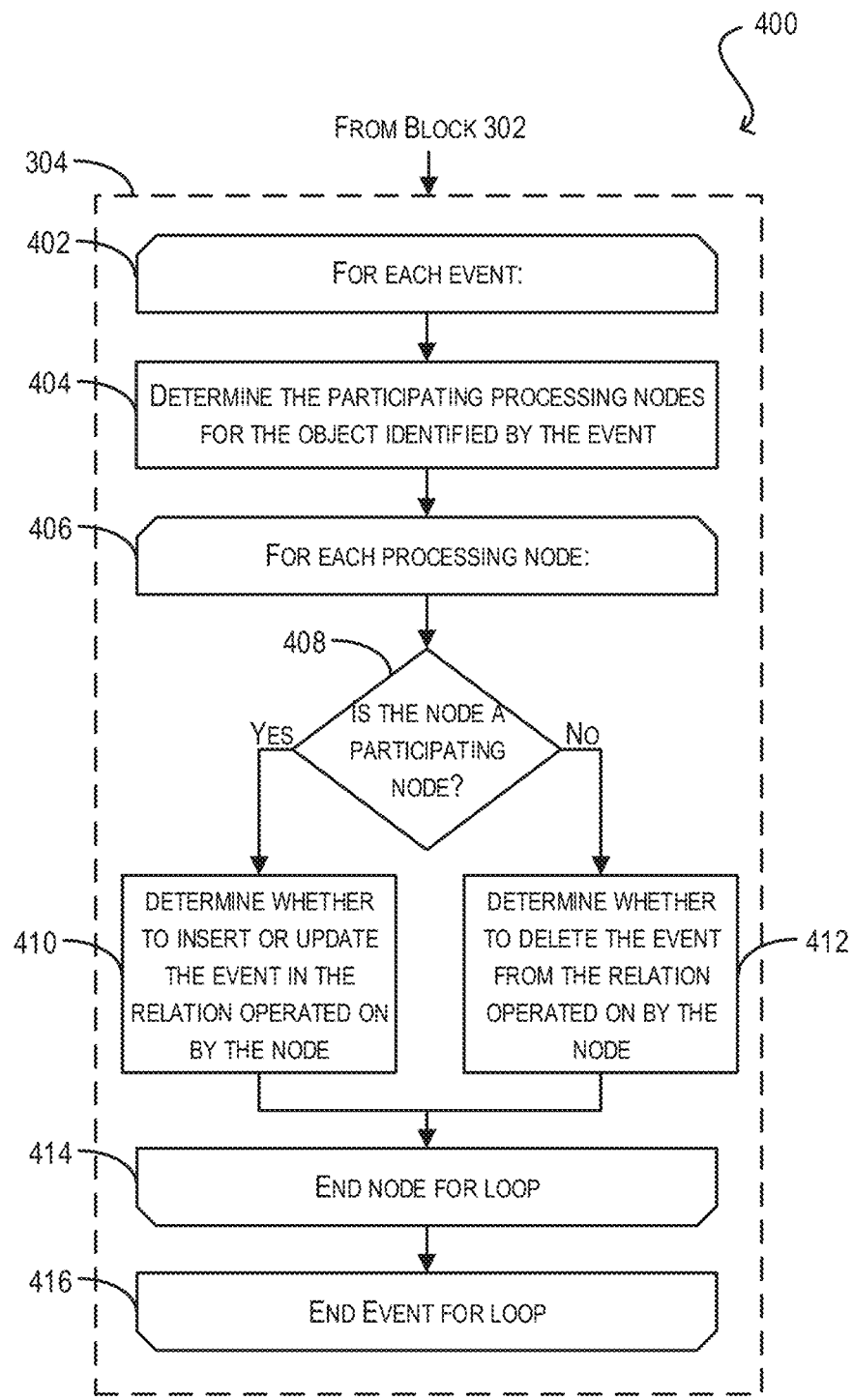

FIG. 4 illustrates a flow 400 that can be executed by overlapping partition adapter 200 as part of the processing of block 304 of FIG. 3. As shown in FIG. 4, for each event received in the event stream, overlapping partition adapter 200 can determine a list of participating processing nodes for the object identified in the event (blocks 402, 404). As discussed above, this determination can be carried out by passing the position of the object to sparse partitioner 202 of FIG. 2. Sparse partitioner 202 can then use the object's position to perform a search (e.g., an Rtree index search) of processing nodes whose spatial region covers the object's position.

Upon receiving the list of participating processing nodes from sparse partitioner 202, overlapping partition adapter 200 can iterate through all of the processing nodes in the system and determine whether a given node is a participating node (e.g., is in the list returned by sparse partitioner 202) (blocks 406, 408). If a given node is a participating node, that means the object identified by the current event should be tracked by the node. Accordingly, overlapping partition adapter 200 can determine whether to insert or update the event into the relation maintained by the node (block 410). If the node is not a participating node, that means the object identified by the event should not (or should no longer) be tracked by the node. Accordingly, overlapping partition adapter 200 can determine whether to delete the event from the relation maintained by the node (block 412).

Once the determination at block 410 or 412 is made, overlapping partition adapter 200 can continue to iterate through all of the processing nodes, and repeat this loop for each incoming event (blocks 414, 416).

Figure 5:
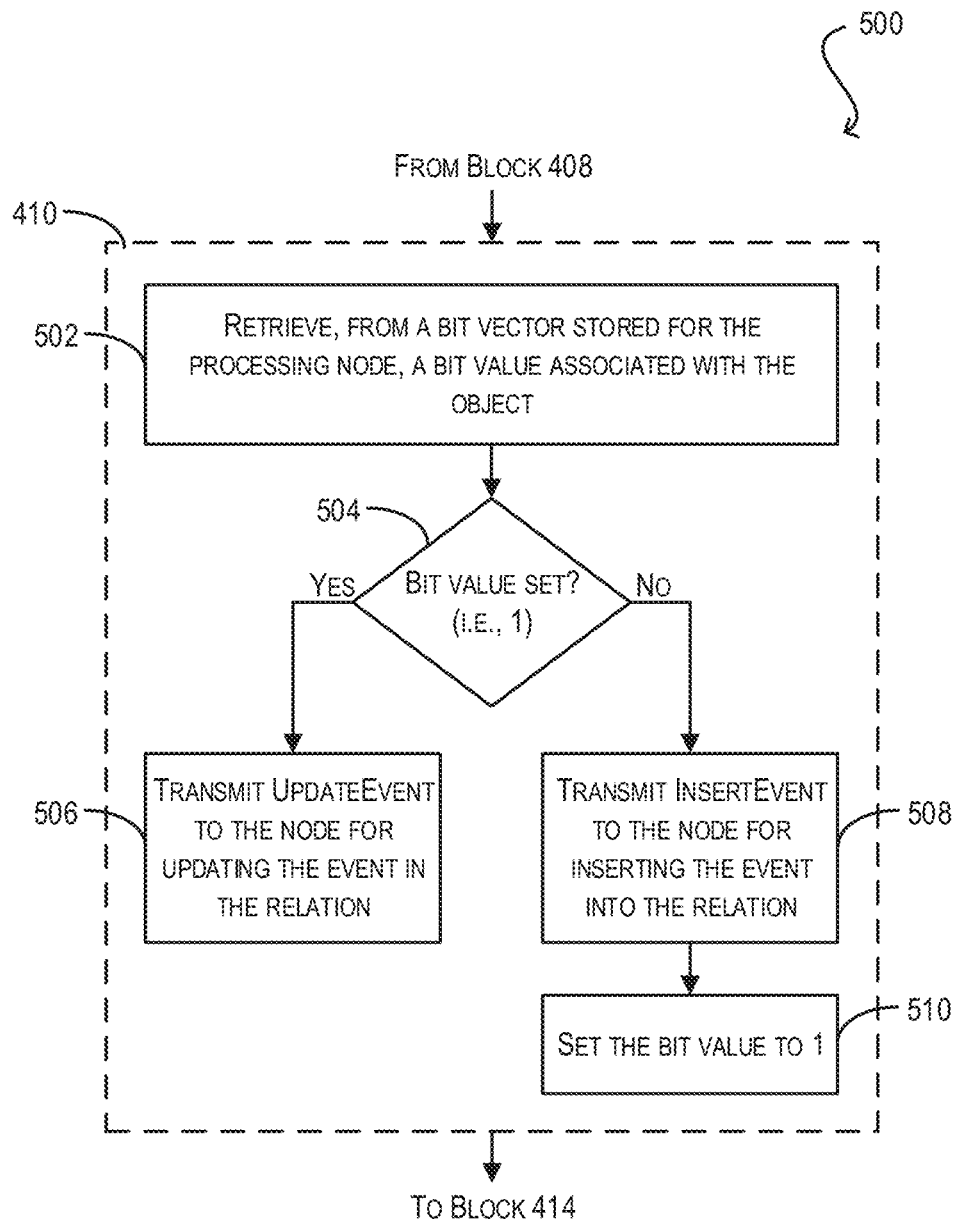

FIG. 5 illustrates a flow 500 that can be executed by overlapping partition adapter 200 as part of the processing of block 410 of FIG. 4. At block 502, overlapping partition adapter 200 can retrieve, from a bit vector stored for the current processing node, a bit value associated with the current object. As discussed above with respect to FIG. 2, a bit vector is stored for each processing node in the system and reflects which objects are currently being tracked by the node.

If the bit value for the object is set (i.e., has a value of one), overlapping partition adapter 200 can transmit an updateevent command to the processing node for updating the event in the relation (blocks 504, 506). If the bit value for the object is not set (i.e., has a value of zero), overlapping partition adapter 200 can transmit an insertevent command to the processing node for inserting the event into the relation (blocks 504, 508). Adapter 200 can then set the bit value (i.e., change the value to one) to indicate that the processing node is now tracking the object (block 510).

Figure 6:
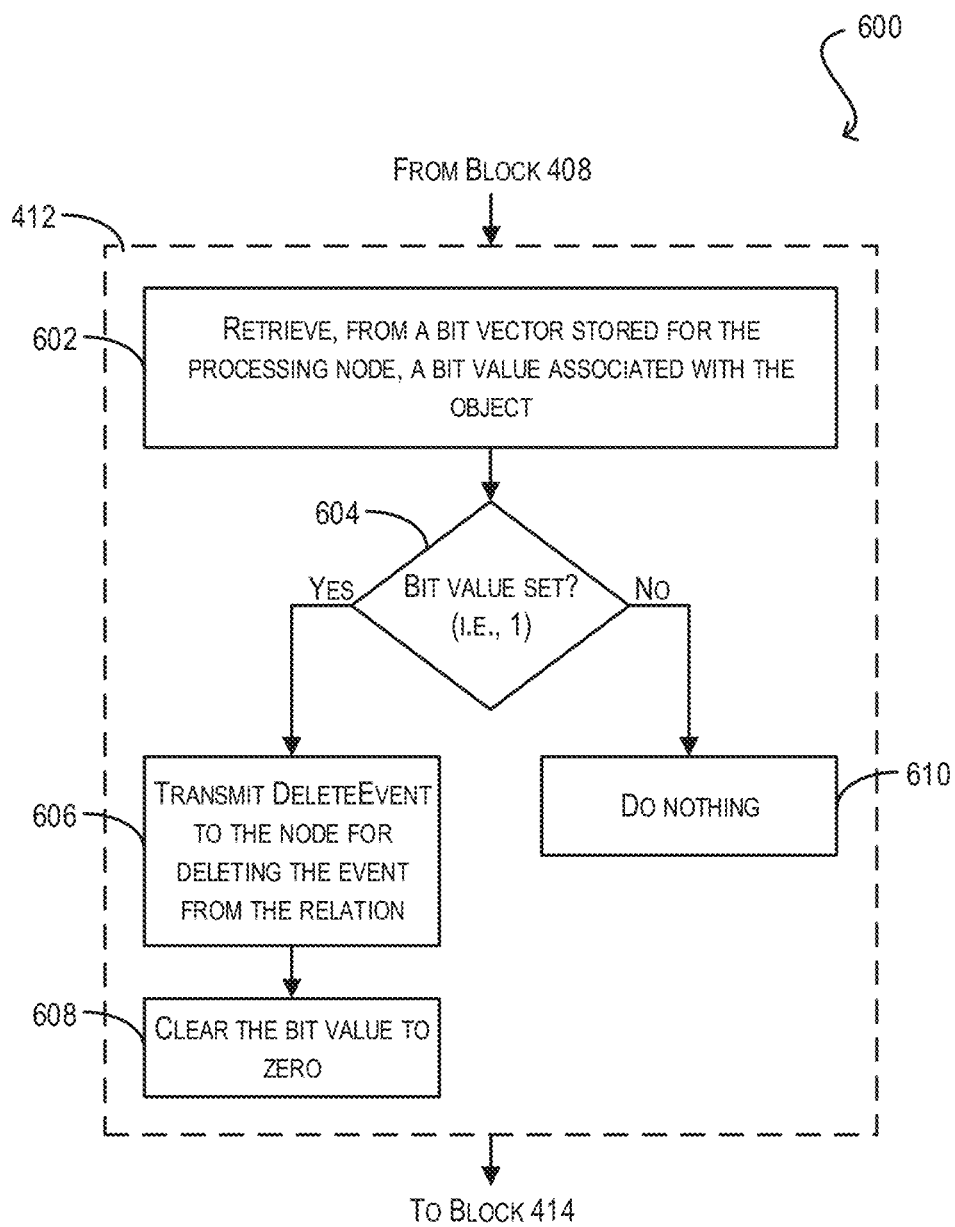

FIG. 6 illustrates a flow 600 that can be executed by overlapping partition adapter 200 as part of the processing of block 412 of FIG. 4. Like block 502 of FIG. 5, overlapping partition adapter 200 can retrieve, from a bit vector stored for the current processing node, a bit value associated with the current object (block 602). If the bit value for the object is set (i.e., has a value of one), overlapping partition adapter 200 can transmit a deleteevent command to the processing node for deleting the event in the relation (blocks 604, 606). The adapter can then clear the bit value (i.e., change the value to zero) to indicate that the processing node is no longer tracking the object (block 608). If the bit value for the object is not set (i.e., has a value of zero), overlapping partition adapter 200 can do nothing (block 610).

It should be appreciated that the flow diagrams depicted in FIGS. 3-6 are illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Using the techniques described above, embodiments of the present invention can support very large scale moving object tracking in an event processing system (e.g., greater than one million objects), while using a relatively small amount of working memory. For example, only 128 Kilobytes of memory are needed per processing node (for the bit vector) for handling one million unique moving objects. Further, note that the module for identifying participating nodes (i.e., sparse partitioner 202) is separate from the insert/update/delete event processing performed by overlapping partition adapter 200. Accordingly different types of partitioning policies can be plugged into the system to support different spatial use cases.

Figure 7:
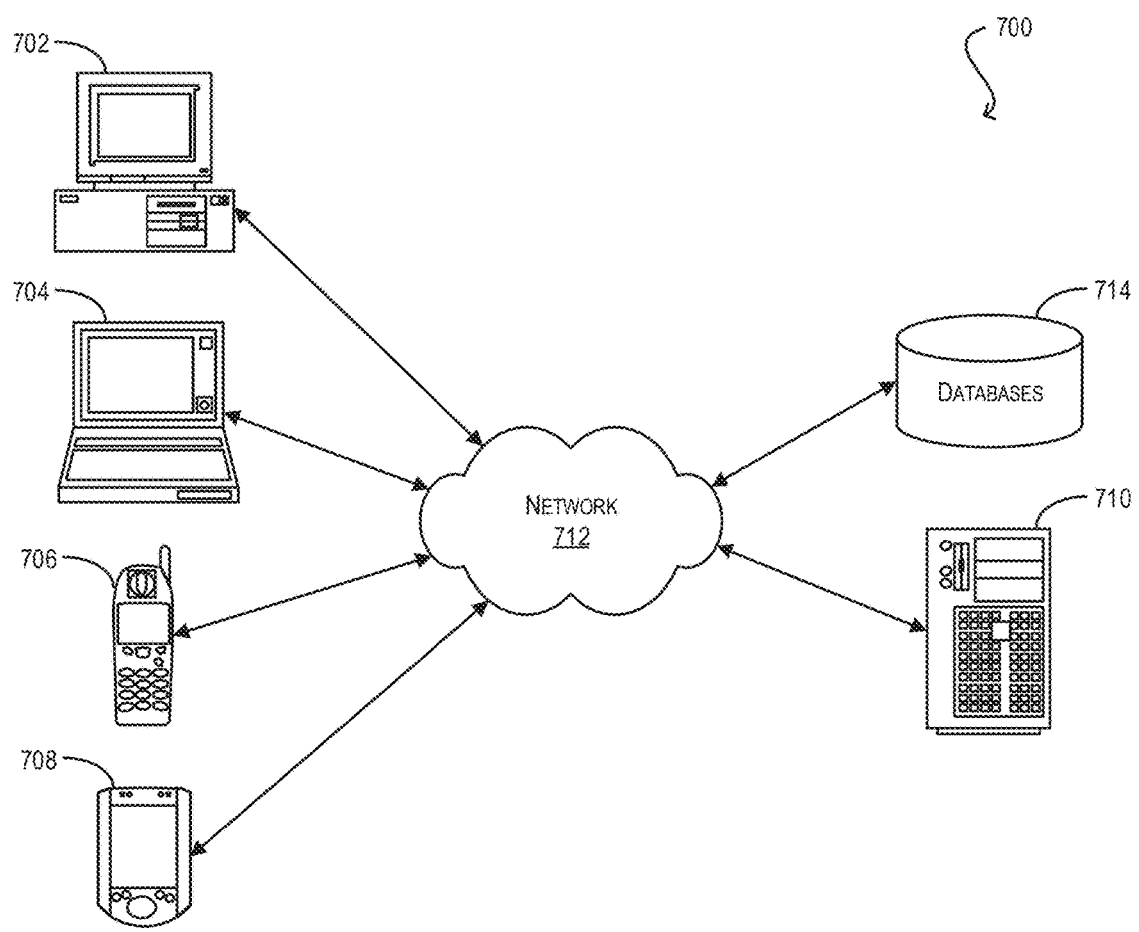
FIG. 7 is a simplified block diagram of a system environment in accordance with an embodiment of the present invention.

FIG. 7 is a simplified block diagram illustrating a system environment 700 that can be used in accordance with an embodiment of the present invention. As shown, system environment 700 can include one or more client computing devices 702, 704, 706, 708, which can be configured to operate a client application such as a web browser, a UNIX/SOLARIS terminal application, and/or the like. In one set of embodiments, client computing devices 702, 704, 706, 708 may be configured to run one or more client applications that interact with event processing system 100 of FIG. 1.

Client computing devices 702, 704, 706, 708 can be general purpose personal computers (e.g., personal computers and/or laptop computers running various versions of MICROSOFT WINDOWS and/or APPLE MACINTOSH operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, 708 can be any other electronic device capable of communicating over a network, such as network 712 described below. Although system environment 700 is shown with four client computing devices, it should be appreciated that any number of client computing devices can be supported.

System environment 700 can further include a network 712. Network 712 can be any type of network familiar to those skilled in the art that can support data communications using a network protocol, such as TCP/IP, SNA, IPX, AppleTalk, and the like. Merely by way of example, network 712 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 can further include one or more server computers 710 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 710 can run an operating system including any of those discussed above, as well as any commercially available server operating system. Server 710 can also run any of a variety of server applications and/or mid-tier applications, including web servers, FTP servers, CGI servers, JAVA virtual machines, and the like. In one set of embodiments, server 710 may correspond to a machine configured to run event processing system 100 of FIG. 1.

System environment 700 can further include one or more databases 714. In one set of embodiments, databases 714 can include databases that are managed by server 710 (e.g., database 108 of FIG. 1). Databases 714 can reside in a variety of locations. By way of example, databases 714 can reside on a storage medium local to (and/or resident in) one or more of computers 702, 704, 706, 708, and 710. Alternatively, databases 714 can be remote from any or all of computers 702, 704, 706, 708, and 710, and/or in communication (e.g., via network 712) with one or more of these. In one set of embodiments, databases 714 can reside in a storage-area network (SAN) familiar to those skilled in the art.

Figure 8:
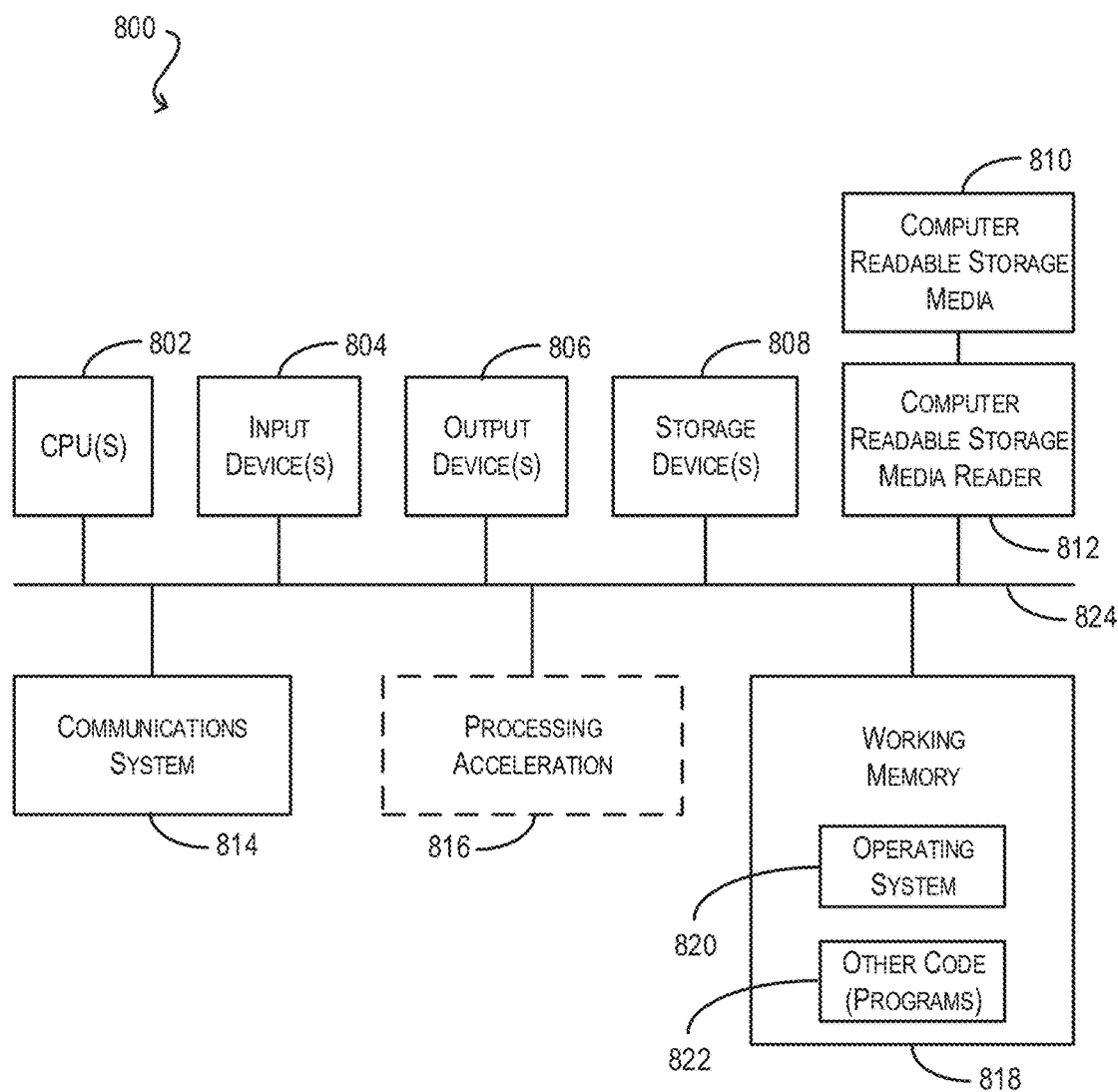
FIG. 8 is a simplified block diagram of a computer system in accordance with an embodiment of the present invention.

FIG. 8 is a simplified block diagram illustrating a computer system 800 that can be used in accordance with an embodiment of the present invention. In various embodiments, computer system 800 can be used to implement any of computers 702, 704, 706, 708, and 710 described with respect to system environment 700 above. As shown, computer system 800 can include hardware elements that are electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 can permit data to be exchanged with network 712 and/or any other computer described above with respect to system environment 700.

Computer system 800 can also comprise software elements, shown as being currently located within working memory 818, including an operating system 820 and/or other code 822, such as an application program (which may be a client application, Web browser, middle tier/server application, etc.). It should be appreciated that alternative embodiments of computer system 800 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 800 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, embodiments of the present invention are not restricted to operation within certain specific data processing environments, but are free to operate within a plurality of data processing environments. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
   receiving, by a computer system, an event stream comprising a sequence of events representing movement of a plurality of objects, the event stream including a first event of the sequence of events, and the first event being associated with a first object of the plurality of objects; and
   partitioning, by the computer system, the event stream among a plurality of processing nodes to facilitate parallel tracking of the plurality of objects using a plurality of bit vectors that correspond to the plurality of processing nodes, each of the plurality of bit vectors comprising a plurality of bit values corresponding to the plurality of objects, and the partitioning of the event stream comprising, for each event in the sequence of events:

determining, by the computer system using a first bit value of a first bit vector of the plurality of bit vectors that is associated with a first processing node of the plurality of processing nodes, that the first processing node is currently tracking the first object of the plurality of objects, the first bit value being associated with the first object;

changing, by the computer system, the first bit value from a second value to a first value that is different than the second value; and transmitting, by the computer system, a command to the first processing node for deleting the first event from a first spatial-region-representing relation that is operated upon by the first processing node.

2. The method of claim 1, wherein:

the plurality of processing nodes operate upon a plurality of spatial-region-representing relations, wherein each event of the sequence of events includes an identifier of the associated object and a current spatial position of the object, and wherein the partitioning the event stream comprises, for each event in the sequence of events:

determining a subset of processing nodes in the plurality of processing nodes configured to track objects in a predefined spatial region that encompasses the current position of the object; and for each processing node in the plurality of processing nodes:

determining whether the processing node is in the subset;

when the processing node is in the subset, determining whether to cause the event to be inserted or updated in a first spatial-region-representing relation operated on by the processing node; and when the processing node is not in the subset, determining whether to cause the event to be deleted from the first spatial-region-representing relation operated on by the processing node.

3. The method of claim 2, wherein determining whether to cause the event to be inserted or updated in the first spatial-region-representing relation operated on by the processing node comprises:

retrieving, from a bit vector associated with the processing node, a bit value associated with the object;

when the bit value is a first value:

transmitting to the processing node a command for inserting the event into the first spatial-region-representing relation; and setting the bit value to a second value; and when the bit value is the second value, transmitting a command to the processing node for updating the event in the first spatial-region-representing relation.

4. The method of claim 3, wherein the first value is zero, and wherein the second value is one.

5. The method of claim 2, wherein determining whether to delete the event from the relation operated on by the processing node comprises:

retrieving, from a bit vector stored for the processing node, a bit value associated with the object; and when the bit value is a second value:

transmitting to the processing node a command for deleting the event from the relation; and setting the bit value to a first value.

6. The method of claim 5, wherein the second value is one, and wherein the first value is zero.

7. The method of claim 1, wherein partitioning the event stream further comprises:

determining, by the computer system, a first bit value of a first bit vector of the plurality of bit vectors that is associated with a first processing node of the plurality of processing nodes, the first bit value being associated with the first object; and determining, by the computer system, a type of the command to be sent to the first processing node based on the first bit value.

8. The method of claim 7, wherein the event stream further includes a second event of the sequence of events that is also associated with the first object, wherein the partitioning further includes:

determining, by the computer system, using a second bit value of the first bit vector, that the first processing node is currently tracking the first object; and transmitting, by the computer system, another command to the first processing node for deleting one or more events associated with the first object from a first spatial-region-representing relation operated upon by the first processing node.

9. The method of claim 1, wherein the computer system is a load balancing node of an event processing system.

10. The method of claim 1, wherein the plurality of objects are motor vehicles.

11. The method of claim 1, wherein each processing node of the plurality of processing nodes is configured to track an object in the plurality of objects in a predefined spatial region, and wherein the predefined spatial region for at least two processing nodes in the plurality of processing nodes overlap, wherein the predefined spatial regions for the plurality of processing nodes are one-dimensional, two-dimensional, or three-dimensional regions.

12. A non-transitory computer readable medium having stored thereon program code executable by a processor, the program code comprising:

code that causes the processor to receive an event stream comprising a sequence of events, the sequence of events representing movement of a plurality of objects, the event stream including a first event of the sequence of events, and the first event being associated with a first object of the plurality of objects; and code that causes the processor to partition the event stream among a plurality of processing nodes to facilitate parallel tracking of the plurality of objects using a plurality of bit vectors that correspond to the plurality of processing nodes, each of the plurality of bit vectors comprising a plurality of bit values corresponding to the plurality of objects, and the partitioning of the event stream comprising, for each event in the sequent of events:

determining, using a first bit value of a first bit vector of the plurality of bit vectors that is associated with a first processing node of the plurality of processing nodes, that the first processing node is currently tracking the first object of the plurality of objects, the first bit value being associated with the first object;

changing the first bit value from a second value to a first value that is different than the second value; and transmitting a command to the first processing node for deleting the first event from a first spatial-region-representing relation that is operated upon by the first processing node.

13. The non-transitory computer readable medium of claim 12, wherein the code that causes the processor to partition the event stream further comprises:

code that causes the processor to identify a first bit value of a first bit vector corresponding to the first processing node, the first bit value being associated with the first object; and code that causes the processor to determine a type of the command to be sent to the first processing node based on the first bit value.

14. The non-transitory computer readable medium of claim 13, wherein the event stream further includes a second event of the sequence of events that is also associated with the first object, wherein the code that causes the processor to partition the event stream further includes:

code that causes the processor to determine using a second bit value of the first bit vector, that the first processing node is currently tracking the first object; and code that causes the processor to transmit another command to the first processing node for deleting one or more events associated with the first object from a first spatial-region-representing relation operated upon by the first processing node.

15. The non-transitory computer readable medium of claim 12, wherein the plurality of objects are motor vehicles.

16. An event processing system comprising:

a load balancer node; and a plurality of processing nodes, wherein the load balancer node is configured to:

receive an event stream comprising a sequence of events, the sequence of events representing movement of a plurality of objects, the event stream including a first event of the sequence of events, and the first event being associated with a first object of the plurality of objects;

partition the event stream among a plurality of processing nodes to facilitate parallel tracking of the plurality of objects using a plurality of bit vectors that correspond to the plurality of processing nodes, each of the plurality of bit vectors comprising a plurality of bit values corresponding to the plurality of objects, and the partitioning of the event stream comprising, for each event in the sequence of events:

determining, using a first bit value of a first bit vector of the plurality of bit vectors that is associated with a first processing node of the plurality of processing nodes, that the first processing node is currently tracking the first object of the plurality of objects, the first bit value being associated with the first object;

changing the first bit value from a second value to a first value that is different than the second value; and transmitting a command to the first processing node for deleting the first event from a first spatial-region-representing relation that is operated upon by the first processing node.

17. The event processing system of claim 16, wherein partitioning the event stream further comprises:

identifying, by the computer system, a first bit value of a first bit vector corresponding to the first processing node, the first bit value being associated with the first object; and determining, by the computer system, a type of the command to be sent to the first processing node based on the first bit value.

18. The event processing system of claim 17, wherein the event stream further includes a second event of the sequence of events that is also associated with the first object, wherein the partitioning further includes:

determining using a second bit value of the first bit vector, that the first processing node is currently tracking the first object; and transmitting, by the computer system, another command to the first processing node for deleting one or more events associated with the first object from a first spatial-region-representing relation operated upon by the first processing node.

19. The event processing system of claim 16, wherein the load balancer node and the plurality of processing nodes correspond to separate processors of a single computer system.

20. The event processing system of claim 16, wherein the load balancer node and the plurality of processing nodes correspond to separate computer systems.

* * * * *